United States Patent [19]

Carter

[11] Patent Number: 4,619,586
[45] Date of Patent: Oct. 28, 1986

[54] EXTERNALLY CONTROLLED VARIABLE PITCH FAN HUB ASSEMBLY

[75] Inventor: William C. Carter, Lenexa, Kans.

[73] Assignee: The Marley Cooling Tower Company, Mission Woods, Kans.

[21] Appl. No.: 633,099

[22] Filed: Jul. 19, 1984

[51] Int. Cl.[4] .................. F04D 29/36; B64C 11/38
[52] U.S. Cl. .................... 416/157 R; 416/167
[58] Field of Search .............. 416/157 R, 157 C, 162, 416/167, 205, 207, 209, 204 R

[56] References Cited

U.S. PATENT DOCUMENTS

| | | | |
|---|---|---|---|
| 2,054,810 | 9/1936 | Gaba | 416/167 X |
| 2,392,341 | 1/1946 | Squier | 416/157 R X |
| 2,826,395 | 3/1958 | Petty | 416/157 R X |
| 3,967,916 | 7/1976 | Chittom | 416/167 R |
| 4,019,792 | 4/1977 | Monroe | 416/154 X |
| 4,221,541 | 9/1980 | Bianchi | 416/157 R |

FOREIGN PATENT DOCUMENTS

| | | | |
|---|---|---|---|
| 631413 | 12/1927 | France | 416/207 |
| 995534 | 12/1951 | France | 416/209 |
| 1091979 | 4/1955 | France | 416/157 R |
| 316487 | 4/1934 | Italy | 416/209 |
| 552035 | 11/1956 | Italy | 416/167 |
| 1011419 | 12/1965 | United Kingdom | 416/157 C |
| 1023824 | 3/1966 | United Kingdom | 416/157 R |
| 1372962 | 11/1974 | United Kingdom | 416/157 R |
| 641169 | 1/1979 | U.S.S.R. | 416/157 R |
| 729383 | 4/1980 | U.S.S.R. | 416/157 R |

Primary Examiner—Everette A. Powell, Jr.
Attorney, Agent, or Firm—Schmidt, Johnson, Hovey & Williams

[57] ABSTRACT

A low profile, externally controlled, variable pitch fan blade hub assembly is disclosed which is especially useful in high humidity environments such as are encountered in the fan induced, hot air discharge section of an industrial water cooling tower. The hub housing has central hub means including a member which is telescoped over the drive shaft therefor to limit the overall height of the assembly. The hub member is biased axially of the hub by a series of peripherally located springs contained within the housing. A fluid such as air may be introduced into the housing under pressure to shift the hub unit in a direction against the spring bias thereon. The housing has a plurality of radially extending bores each of which rotatably receives a respective fan blade axle provided with an elongated arm on the innermost end thereof within the housing positioned such that a cam follower on each arm is received in a cam track forming a part of the hub unit. As the hub unit shifts in the housing in response to introduction of pressurized fluid or release of fluid from the housing, concomitant swinging of the cam follower arm rotates the blade axles to simultaneously vary the pitch of the fan blades. Recessing of the hub unit springs in the housing and the use of a plurality of such springs around the circumference of the hub unit assures uniformity of spring bias on the hub unit without impairment of the moisture sealing integrity of the hub housing.

13 Claims, 8 Drawing Figures

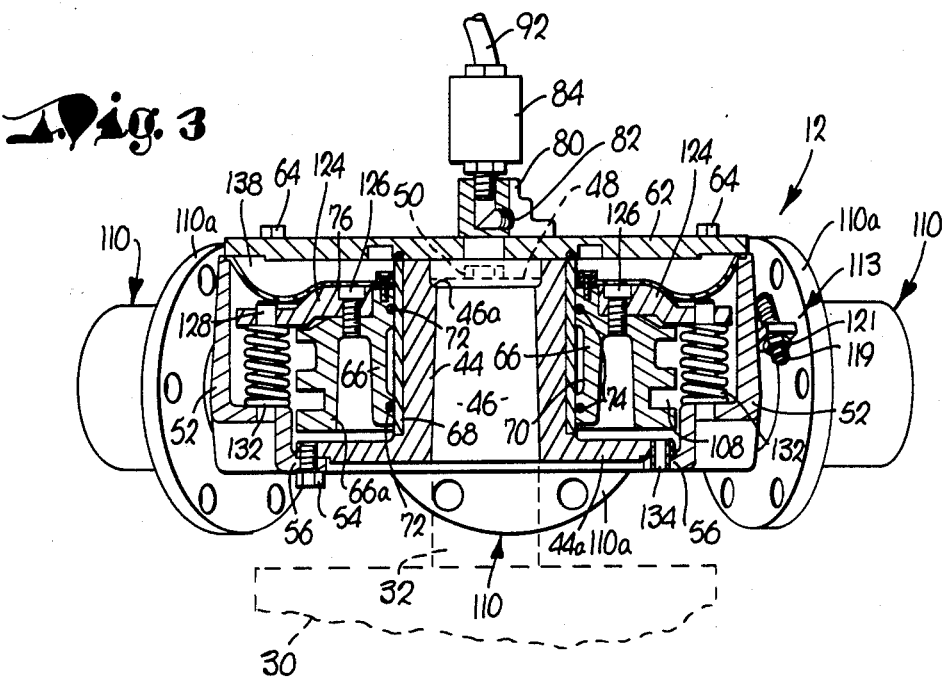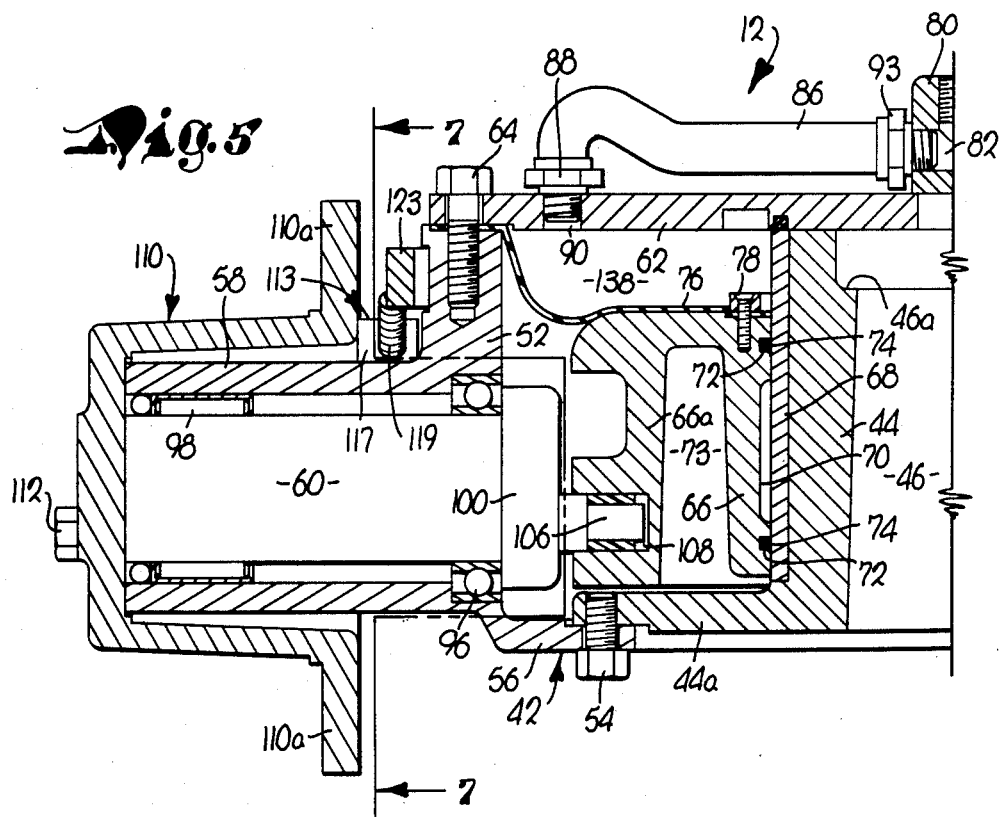

EXTERNALLY CONTROLLED VARIABLE PITCH FAN HUB ASSEMBLY

BACKGROUND OF THE INVENTION

1. Field of the Invention

This invention relates to apparatus for simultaneously varying the pitch of a plurality of fan blades of a fan assembly forming a part of an induced draft water cooling tower or the like. Typically, such fans may have an overall diameter as great as 10 meters.

2. Information Disclosure Statement

Industrial water cooling towers serve the purpose of reliably providing cooling water to process equipment or power plant steam condensers at specified cold water temperatures under widely varying ambient temperature and relative humidity conditions. Since the cost of operating cooling towers has become a much more critical design factor in recent years because of energy costs including expenses associated with fan motor operation, more emphasis is now being given to ways to economically assure flow of adequate air through a particular tower design.

In order to effectively control the temperature of cold water from the tower and particularly to maintain such temperature at least as low as prescribed by the user, various operating parameters of the tower or process have been monitored and the data usually used to control fan operation. Efforts have centered on use of controllers functional to turn fans on or off, change the speed of the fans, or vary the pitch of the fan blades. Sensing units have been provided to measure air, water or process temperatures. The values obtained are then employed to control fan operations. Certain prior designs involved two-speed fan motors giving the operator a choice between off, low speed or high speed fan rotation. There are advantages from an initial cost as well as operating efficiency to the use of variable pitch fan blade units, but design problems have impeded more widespread adoption of variable pitch fan blade systems in the cooling tower industry.

One deterrent has been the rather hostile environment in which the assembly must operate. Warm moist air is present on a continuous basis. Users often add agents to the water to control algae and fungus. Icing can occur in extremely cold weather. Galvanic corrosion may be a factor from the use of dissimilar metals. Minerals in the water can accumulate on the fan components.

One variable pitch fan blade unit which has found some success was placed in use by the assignee hereof some time ago. This unit employed a constant speed electric motor for driving a variable pitch fan. A temperature sensitive controller was used to control supply of pressurized fluid to the unit for varying the pitch of the blades to maintain a required cold water temperature. This assembly had a centrally compression spring within an enclosure which extended upwardly from the fan housing for biasing a hub within the housing in opposition to pressurized fluid directed to the unit. While this device overcame many of the problems encountered with the control and operation of cooling tower fans and utilized a relatively economical constant speed motor, the unit was not acceptable in many applications because of the height of the assembly. The increased height of the fan hub assembly including the compression spring and a centrally located actuating mechanism raised the overall height of the fan and therefore required a substantially higher fan cylinder.

A need has therefore existed in the art for variable pitch fan apparatus of the type described hereinbefore but having a compact overall height accomplished by telescoping blade pitch mechanism over the fan shaft so that the fan assembly may be installed within existing cooling towers without the need for increasing the overall height of the fan cylinder.

SUMMARY OF THE INVENTION

The hub assembly for varying the pitch of a series of radially extending fan blades has a lower profile than heretofore possible for units of this type by provision of a centrally located hub assembly which is disposed in surrounding relationship to the fan shaft and provided with a hub member which is shiftable axially of the hub assembly to vary the pitch of the fan blades. A series of relatively short coil springs are located equidistantly around the perimeter of the hub member within the hub assembly housing to provide uniformly distributed bias forces in one direction against the hub member. Thus, when a pressurized control fluid is selectively supplied to the hub assembly housing in a direction opposed to the force of the coil springs, the hub member shifts axially in one direction in response to introduction of such fluid. Controlled reduction of fluid pressure in the hub assembly housing results in movement of the hub member in the opposite direction under the bias of the coil springs thereon.

Each of the fan blades has an inner axle section rotatably received within a corresponding radially directed bore in the hub assembly housing. Crank arms secured to the innermost ends of each of the axle sections within the hub assembly housing are provided with cam followers thereon received within a peripheral cam track in the outer perimeter of the centrally located hub member. Reciprocation of the hub member therefore has the effect of simultaneously swinging all of the axle lever arms and concomitantly rotating the axle sections and thereby the fan blades secured thereto to vary the pitch of the blades.

In a preferred embodiment of the invention, six separate coil springs are provided around the periphery of the central hub member in biasing engagement therewith thus providing reliable and stable control over shifting of the hub member and thereby variation of the pitch of the fan blades notwithstanding the fact that the fan load forces are fairly high, particularly where the overall diameter of the fan is of the order of 10 meters or more.

Telescoping of the pitch variation hub member within the fan assembly housing in surrounding relationship to the fan shaft therefor and location of a series of relatively short coil springs within the housing and bearing against the hub member in biasing engagement therewith allows provision of a hub assembly of limited overall height, assures stable operation of the hub assembly over a wide range of fan blade sizes, minimizes the problems of providing a unit which is protected against adverse entrance of moisture, and exhibits lower hysteresis within the mechanism than has been the case with prior hub units.

Although the invention has most beneficial utility for controlling the pitch of large diameter water cooling tower fans, it is to be understood that the hub assembly may be used in a number of equivalent applications such as air moving systems of various types including those installed in buildings or used in various industrial and manufacturing or production processes, wind energy utilization or electrical generation equipment, wind tunnels, and related devices.

BRIEF DESCRIPTION OF THE DRAWINGS

FIG. 3 is a vertical cross-sectional view taken substantially on the line 3—3 of FIG. 2;

FIG. 5 is an enlarged, partial sectional showing the blade axle, hub member, and cam follower means in a position which provides for minimum pitch of the blade attached to such axle section;

DETAILED DESCRIPTION

Figure 1:
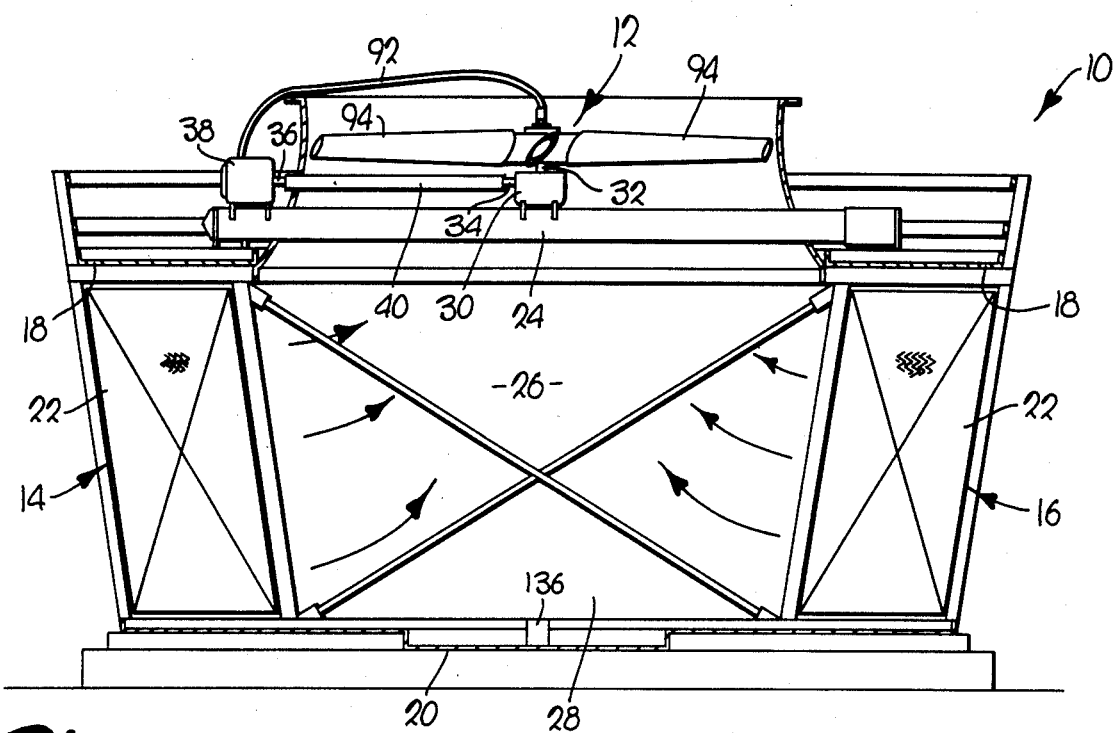
FIG. 1 is a vertical cross-sectional view in essentially schematic format illustrating a typical opposed flow water cooling tower embodying fan blade and hub assembly apparatus of the present invention and illustrating the manner in which the low profile of the externally controlled variable pitch fan hub assembly allows utilization of a fan cylinder of optimum height while avoiding guard railing and safety structure over and above that normally provided in towers of this type.

The crossflow water cooling tower 10 illustrated in FIG. 1 of the drawings and embodying externally controlled variable pitch fan hub assembly apparatus 12 in accordance with the preferred concepts of this invention, is shown for illustrative purposes only and depicts one type of water cooling tower in which the improved apparatus 12 hereof may be advantageously utilized. It is to be understood though, that the externally controlled variable pitch fan hub assembly apparatus 12 of this invention may be used in various types of cooling towers and the utility of such apparatus is not limited to crossflow towers of the specific type illustrated in FIG. 1.

Tower 10 is representative of conventional crossflow towers in that it has two parallelogram-shaped fill assemblies 14 and 16 each of which is located between a respective overlying hot water distribution basin 18 and a common underlying cold water collection basin 20. The fill assemblies 14 and 16 are shown as being made up of a series of vertically-oriented, horizontally-spaced chevron pattern film fill sheets 22 which receive hot water from corresponding distribution basins 18 and deliver cold water to the cold water collection basin 20. Again, it is to be understood that film fill sheets 22 have been depicted for illustrative purposes only and apparatus 12 is useful with various types of cooling towers including those having splash or water break-up bars or the like, oriented either perpendicular or parallel to air flow through fill assemblies 14 and 16.

A cross member 24 extending across the space above the plenum chamber 26 of tower 10 and parallel with the casing sidewalls 28 supports a gear unit 30 having an upright output shaft 32. The input shaft 34 of gear unit 30 is connected to the shaft 36 of constant speed electric motor 38 by a coupling 40.

Apparatus 12 is mounted on shaft 32 of gear unit 30 for rotation by the latter during operation of motor 38.

The housing of apparatus 12 broadly designated by the numeral 42 (see FIGS. 2–6, inclusive and particularly FIG. 3) includes a central flanged coupling 44 having a central cavity 46 which telescopically receives the upright output shaft 32 of gear unit 30. As is apparent from FIGS. 3, 5 and 6, the normally uppermost end of cavity 46 is enlarged to present a shoulder 46a which receives a cap member 48 located to directly overlie the upper end of output shaft 32. Cap screws 50 passing through cap member 48 and threaded into the upper end of output shaft 32 serve to rigidly affixed housing 42 to the shaft 32 of gear unit 30. The outwardly directed, circular, peripheral flange portion 44a of coupling 44 is joined to a cylindrical, wall defining housing element 52 by a series of studs 54 passing through the lower annular rim 56 of element 52 into the periphery of flange 44a. Element 52 has six integral, radially directed tubular extensions 58 which serve as bore defining sockets for receiving corresponding blade axle sections 60. A circular cover plate 62 closes the upper end of housing element 52 and is secured to the latter by a series of studs 64 extending through the perimeter of plate 62 and threaded into the upper wall segment of housing element 52.

Figure 6:
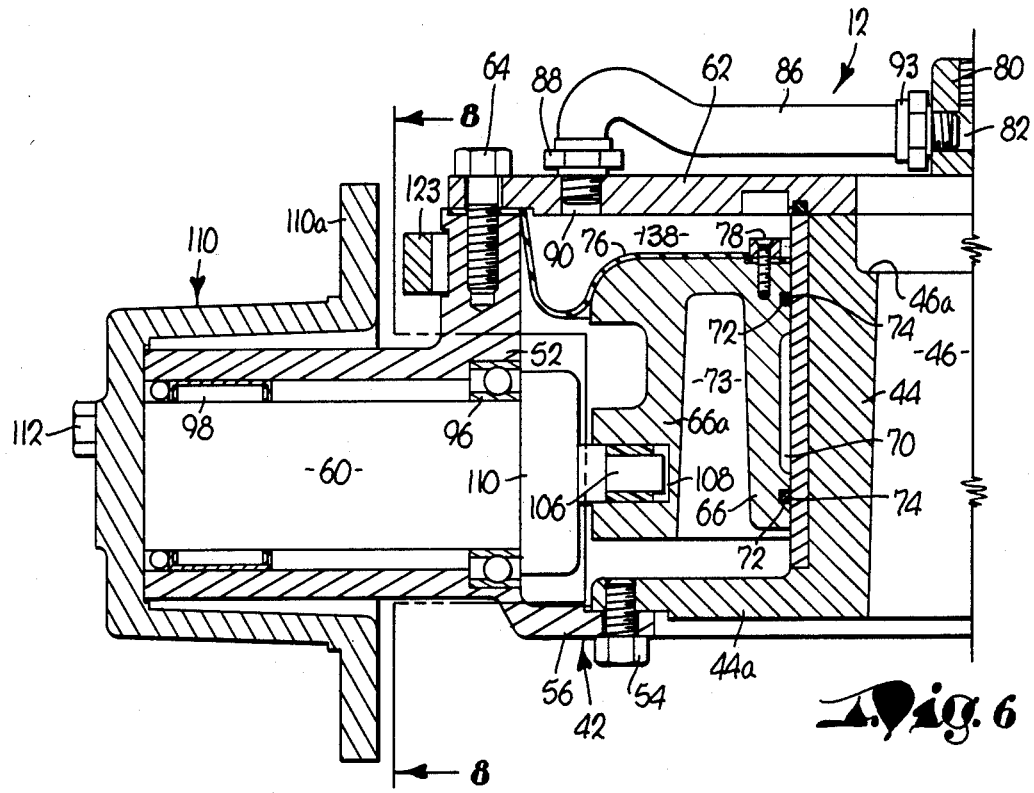
FIG. 6 is an enlarged, partial sectional view similar to FIG. 5 but showing the hub member in another position thereof with the cam follower means having been moved to rotate the blade axle section depicted through a displacement to vary the pitch of the blade attached to such axle section.

As best shown in FIGS. 3, 5 and 6, annular hub means in the nature of a hub member 66 surrounds coupling 44 and is in slidable engagement with the outer cylindrical face of sleeve 68 overlying and supported by the cylindrical main body portion of coupling 44. The inner face 70 of hub member 66 has a pair of vertically-spaced, circumferentially extending grooves 72 therein which receive respective O-ring seals 74.

In order to reduce the mass of hub member 66, it preferably is constructed in a fashion to define an annular, inverted groove 73 coaxial with the inner face 70 of the hub.

An annular, flexible diaphragm 76 is positioned on the top of hub member 66 and is secured by fastening means 78 to the inner circumference of the top face of hub member 66, as well as to the housing element 52 between the upper surface of the latter and the outer perimeter of circular plate 62. Fitting 80 (FIGS. 2, 3, 5 and 6) mounted on the upper face of plate 62 and provided with an L-shaped passage 82 therein mounts a rotary coupling 84 in fluid communication with passage 82. Conduit 86 (FIGS. 2, 5 and 6) serves to intercommunicate the interior of housing 42 and fluid coupling 84 by virtue of the fact that conduit 86 is joined to a nipple 88 threaded into an aperture 90 in the top plate 62. Conduit 86 is also joined to a nipple 93 threaded into the horizontal portion of passage 82 of fitting 80. A flexible hose 92 leads to a suitable source of pressurized fluid such as air under the control of sensing mechanism which is responsive to water temperature, process conditions or other parameters that are monitored for the purpose of varying the pitch of fan apparatus 12 accordingly.

As illustrated, the variable pitch blade and hub assembly making up apparatus 12 has six individual, radially extending blade units 94. Each of the units 94 has an axle section 60 as previously described which is telescoped in a corresponding cylindrical extension 58 of housing 52 and mounted for rotation therein by an inner ball bearing assembly 96 and an outer needle bearing assembly 98. Crank arm 100 bolted to the innermost face of each of the axle sections 60 through the medium of a series of studs 102 has an arm extension 104 which mounts a cam follower 106 on the outer extremity thereof. The outer wall section 66a of hub member 66 is provided with an outwardly facing inwardly directed circular cam groove 108 therein which receives the cam followers 106 of each of the crank arms 100.

It is apparent that as the hub member 66 reciprocates vertically about the axis of shaft 32, crank arms 100 and thereby the axle sections 60 joined thereto, are rotated about the axes of respective axle sections 60. Mounting cups 110 telescoped over each of the radial extensions 58 and secured to the outer ends of corresponding axle sections 60 by bolts 112 serve as means for mounting each of the blades 114. Flanges 116 on the innermost end of each blade 114 are constructed to overlie and be secured to the circular flange portions 110a of cups 110 in concentric relationship thereto. A series of bolts 118 extending through flanges 116 of blades 114 and threaded into respective flange portions 110a of mounting cups 110 serve to securely affix blades 114 to corresponding axle sections 60 as the blades telescope over and complementally engage the exterior surfaces of the mounting cups 110.

Figure 2:
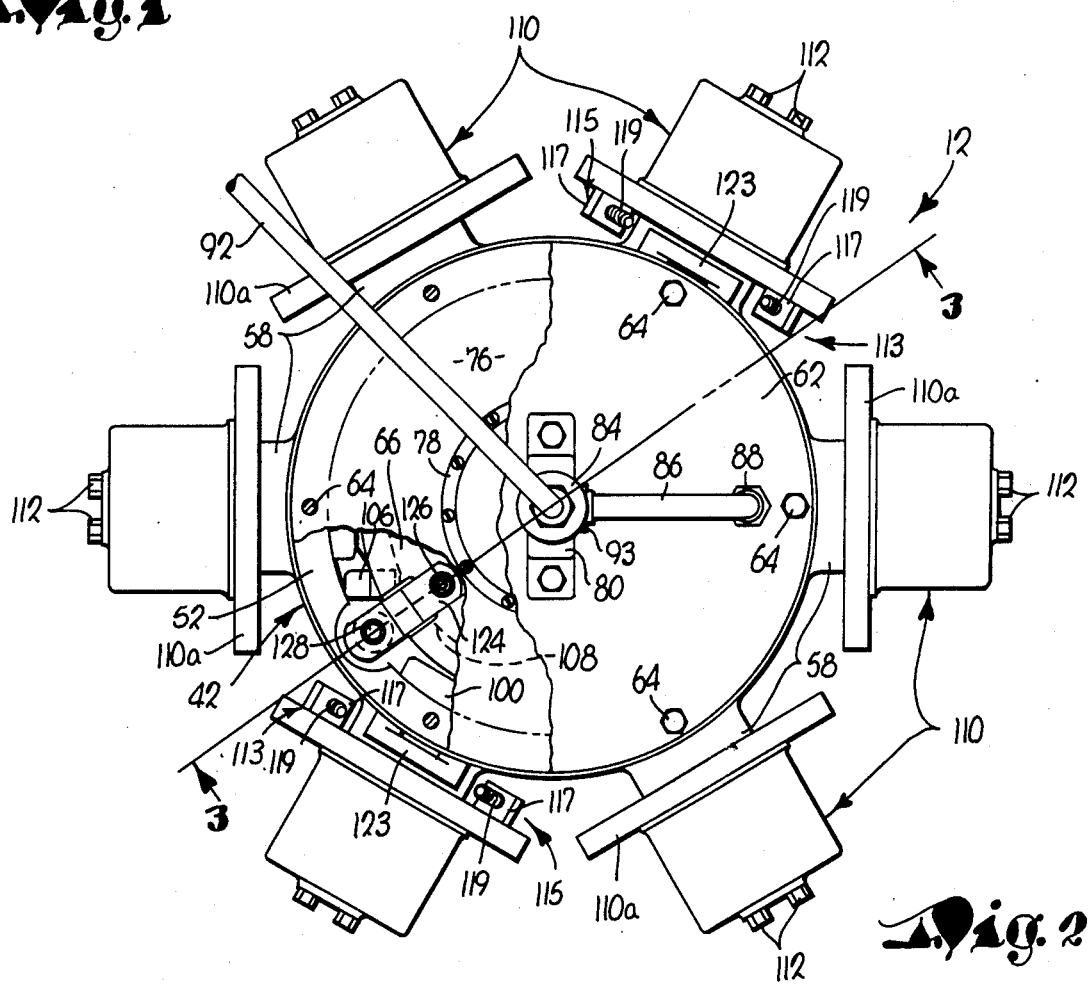
FIG. 2 is a plan view of the hub assembly of the present invention with parts being broken away for clarity.
Figure 4:
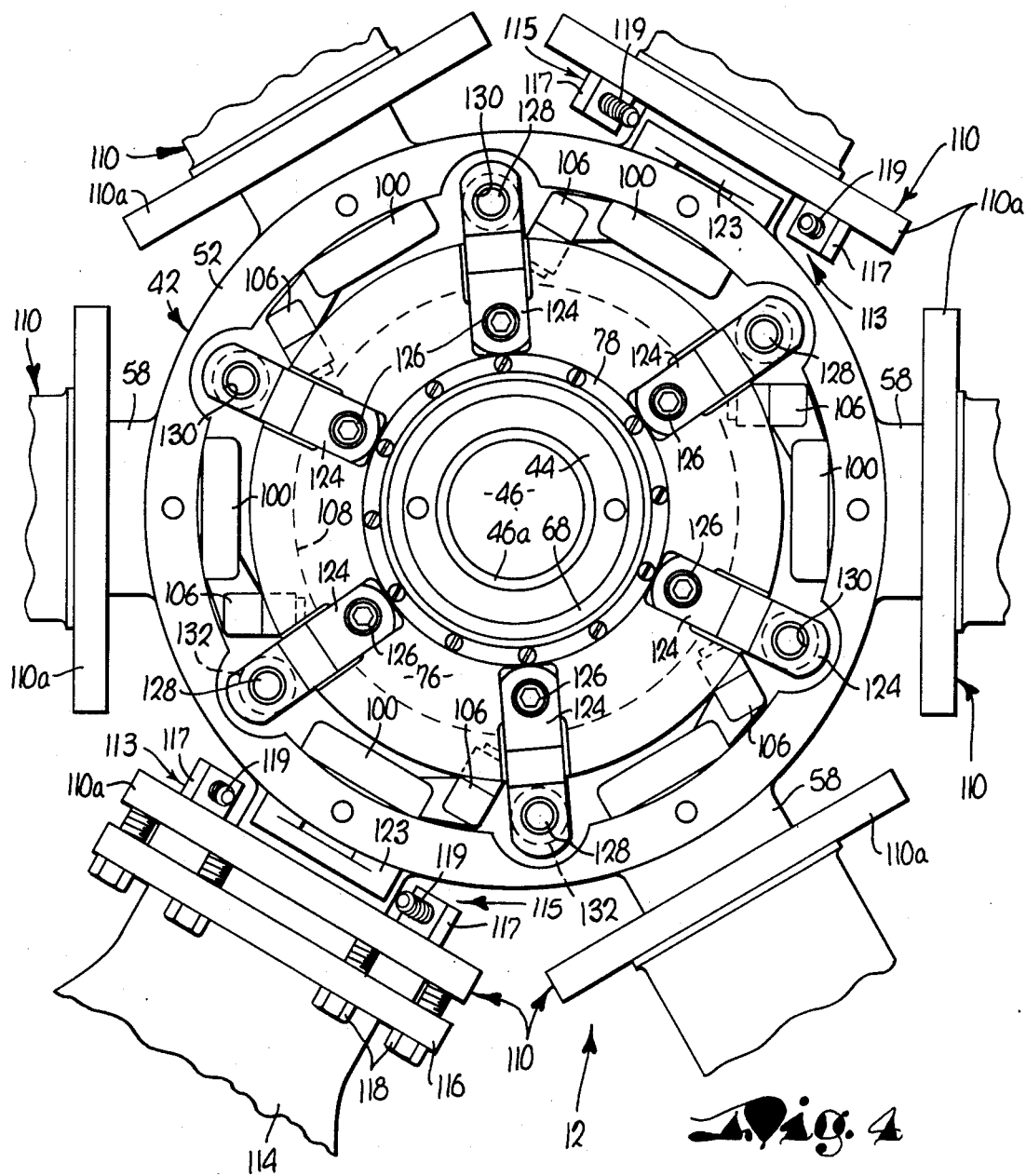
FIG. 4 is an enlarged, fragmentary plan view of the fan blade and hub assembly apparatus of this invention with the internal flexible diaphragm and the top plate of the hub housing removed to reveal details of construction of the hub assembly. and with the individual fan blades being broken away adjacent the axle sections thereof.

Means for limiting the extent of rotation of axle sections 60 and thereby blades 114 takes the form of two pairs of adjustable limit devices 113 and 115 respectively located 180° apart from one another as best shown in FIGS. 2, 4 and 5–8. A pair of devices 113 and 115 are associated with corresponding directly opposed mounting cups 110 of oppositely directed fan blades as best shown in FIG. 2. Each of the devices 113 and 115 includes an internally threaded projection 117 secured to the inner face of a corresponding flange 110a of a respective mounting cup 110. Screws 119 threaded into each projection 117 have lock nuts 121 thereon which jam against a proximal projection 117. Screws 119 of each pair of devices 113 and 115 engage opposite sides of corresponding fixed bosses 123 (FIGS. 4 and 5) projecting outwardly from housing 52 and also located in 180° spaced-apart relationship around the perimeter of such housing.

Figure 8:
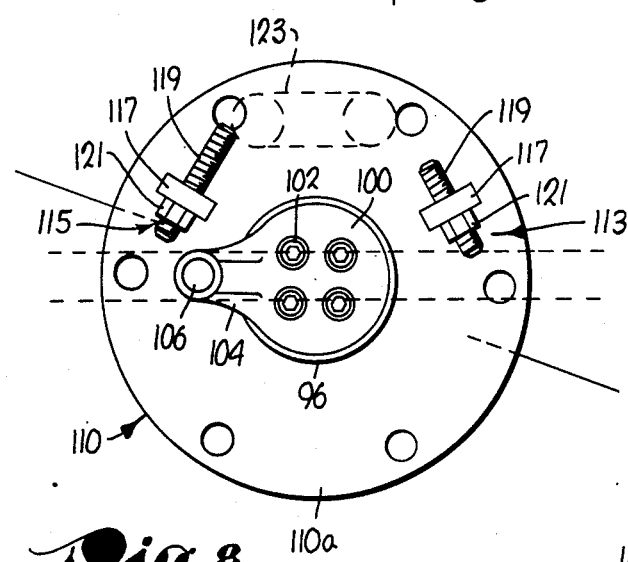
FIG. 8 is a sectional view taken along the irregular line 8—8 of FIG. 6 and shows the cam follower in the location thereof when the hub member is disposed in the position of the latter illustrated in FIG. 6.
Figure 7:
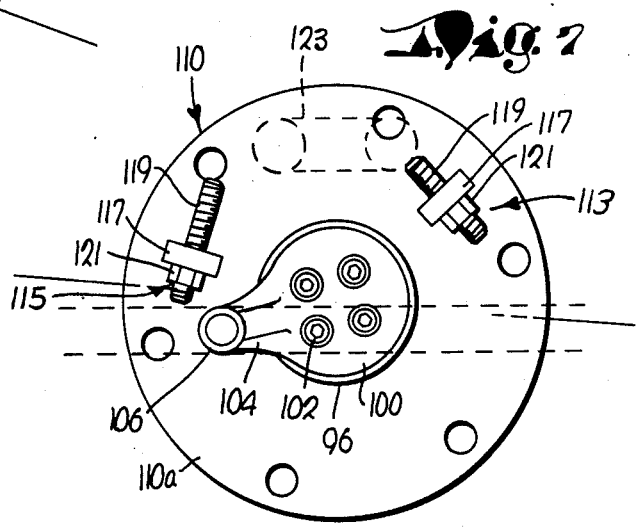
FIG. 7 is a sectional view taken along the irregular line 7—7 of FIG. 5 looking in the direction of the arrows and showing the disposition of the cam follower when the hub member is in the position illustrated in FIG. 5.

Referring to FIGS. 7 and 8, the crank arm 100 associated with one of the pairs of adjustable devices 113 and 115 is illustrated. The left device 115 controls shifting of the hub member 66 upwardly; the opposed right hand device 113 controls downward shifting of the hub member 66. As a consequence, the devices 113 limit the minimum pitch angle of the fan blades while devices 115 function to limit the maximum pitch angle of such blades.

Although blades 114 may be fabricated of various types of material, a preferred embodiment of the invention utilizes hollow blades which are constructed of glass fiber reinforced synthetic resin material. Such construction allows fabrication of blades of the most desirable aerodynamic configuration having requisite compounds curves of different angularity along the longitudinal length of respective blades. Furthermore, such blades are of less weight than if fabricated out of metal to give a corresponding strength to weight ratio. Furthermore, the synthetic resin blades resist corrosion and deterioration in the relatively hostile environment that is present in the hot air discharge section of tower 10.

Referring to FIG. 1, it can be seen that tower 10 is provided with an air discharge stack or cylinder 120 which has an eased air inlet section 122 communicating directly with the plenum chamber 26 of the cooling tower 10. Blades 114 are of a length to terminate in relatively close proximity to the interior surface of the cylinder 120.

Returning to FIGS. 2, 3 and 4, it is to be seen that six cantilever mounted straps 124 are secured on the upper surface of hub member 66 in equidistant spaced relationship and projecting radially from the axis thereof, with bolts 126 extending through corresponding straps 124 and threaded into the upper face of hub member 66 functioning to securely affix the straps 124 to hub member 66. Upright guide posts 128 affixed to the element 52 adjacent the upright wall thereof, aligned with corresponding straps 124 and received within suitable apertures 130 in straps 124, are telescoped within respective coil springs 132 trapped between each of the straps 124 and a proximal floor section of housing 52. Springs 132 are of a length to provide a bias force against hub member 66 of a magnitude to normally maintain the hub 66 in the normally uppermost position of the same depicted in FIGS. 3 and 6. Hollow pin 134 extending through flange 44a of coupling 44 and the rim 56 of cylindrical housing element 52 (see FIG. 3) communicates the interior of housing 52 below diaphragm 76 with the surrounding atmosphere while preventing entrance of liquid by virtue of the relatively covered location of such pressure equalizing orifice.

Although as previously indicated, control of apparatus 12 may be accomplished through any number of different sensors, one exemplary embodiment may for example comprise a thermosensitive device 136 (FIG. 1) preferably located in the depressed central area of cold water basin 20 to monitor the temperature of the cold water leaving the tower 10. The output signals from such thermosensitive device are used to control a source of pressurized fluid such as air to housing 42 via line 92.

OPERATION

During operation of the electric motor 38, gear unit 30 is driven via coupling 40 to thereby rotate shaft 32 and the hub and fan assembly apparatus 12 mounted thereon. Fan blades 114 are driven in a direction to cause ambient air to be drawn into the interior of tower 10 via opposed inlets whereby the air flows in crossflow relationship to hot water gravitating onto respective fills from hot water distribution basins 18 at opposite ends of the tower. Water which has been cooled by the crossflow air currents is collected in basins 20 for return to the process or condensing equipment or the like. Air is discharged from the plenum chamber 26 through the cylinder 120 which functions to limit recirculation of hot air back into the tower.

Assuming initially that the fan is being driven with the blades 114 thereof at minimum pitch, the disposition of crank arms 100 in this mode of operation is illustrated in FIG. 7 with control fluid under pressure within hub chamber 138 above diaphragm 76 and below cover plate 62. The pressurized fluid is directed from the source thereof via line 92, rotary coupling 84, fitting 80, and conduit 86 to the interior of housing 42. The fluid under pressure forces the hub member 66 downwardly against the bias of coil springs 132 into the disposition illustrated in FIG. 5 as limited by respective devices 113 thus causing the cam followers 106 located in groove 108 to be at their lower positions for minimum blade pitch.

When the sensing mechanism which monitors either the process, or cold water temperature as for example would be sensed by device 136, calls for more air to be pulled through tower 10 by an increase in the pitch of blades 114, such reading results in the controller decreasing the air pressure within housing 42 via the path previously described. As the pressure within chamber 138 decreases, coil springs 132 function to exert force on straps 124 thereby raising hub member 66 and rotating axle sections 60 as cam followers 106 are moved upwardly to pivot crank arms 100 until restrained against further movement by corresponding limit devices 115. It is to be perceived in this respect that the diaphragm 76 serves to isolate chamber 138 within housing 42 from the remainder of the hub assembly 12.

The coarsest pitch position of blades 114 is depicted in FIG. 8 wherein it can be seen that the cam followers 106 riding in groove 108 have reached the uppermost end of their path of travel and crank arms 100 have been rotated through an arcuate displacement reflecting shifting of hub member 66 to the uppermost end of its path of travel as illustrated in FIG. 6 as controlled by the devices 115. It is apparent that as pressurized control fluid is delivered to chamber 138 or released therefrom, hub member 66 will descend or move upwardly as the case may be thereby simultaneously rotating crank arms 100 and thereby blades 114 rigidly affixed thereto, in direct response to the fluid pressure within chamber 138. Displacement of hub member 66 from the normally uppermost position thereof against cover plate 62 as shown in FIG. 6 toward the lowermost position of the same as shown in FIG. 5 does not cause a buildup of pressure within the lower part of housing 42 by virtue of the hollow pin 134 communicating the lower part of the hub with the surrounding atmosphere.

It is to be appreciated that the hub apparatus is permitted to freely rotate with respect to the pressurized fluid supply line 92 by virtue of the provision of rotary coupling 80 therebetween.

Of particular note is the low profile presented by apparatus 12 which is attributable not only to the way in which shaft 32 of gear unit 30 is telescopically received within hub member 66, but also because of the provision of relatively short coil springs 132 which surround the hub member 66, bear against straps 124, and serve to impose evenly distributed bias forces in an upward direction on the hub member 66 against fluid pressure within cavity 138 of housing 42.

Another feature of the present invention is the fact that the components are well shielded against corrosion, the parts lend themselves to relatively easy disassembly and assembly for maintenance purposes, and the hub assembly apparatus may be employed as direct replacement for a non-variable pitch fan hub since the fan elevation of both units is the same. No change in the height of the fan cylinder is necessary.

What is claimed is:

1. Variable pitch fan blade and hub assembly adapted to be mounted on a power driven shaft comprising:
   a rotatable housing having a central coupling configured to be secured to the driven shaft and provided with a length extending axially of the shaft when the assembly is mounted thereon, said housing further being provided with a plurality of radially-extending bores;
   a fan blade for each housing bore;
   an axle section connected to each blade and rotatably received in a corresponding housing bore;
   transmission means within the housing and operably coupled to said axle sections for imparting a rotational moment to each axle section such that the pitch of the blades is varied, said transmission means includes cam follower means extending from the inner end of each of said axle sections, said cam follower means being disposed eccentrically relative to said inner end of each of said axle sections;
   hub means including a hub member disposed coaxially within said housing, said hub member being complementally telescoped over said coupling and selectively movable longitudinally thereon relative to the rotational axis of said housing, said hub means being provided with circumferentially-extending cam track means, said cam track means cooperating with said cam follower means such that when said hub means moves longitudinally relative to the rotational axis of said housing, said cam follower means follows said cam track means so that a rotational moment is imparted to said axle section due to said eccentric disposition of said cam follower means relative to said inner end of said axle section for simultaneously varying the pitch of the blades; and
   a plurality of springs within said housing and engaging said hub means outboard of said hub member for biasing said hub means longitudinally relative to the axis of rotation of said housing, said springs being spaced circumferentially around said hub means and being positioned within the housing outboard of said cam track means.

2. Apparatus as set forth in claim 1, wherein said rotatable housing is substantially toroidal in configuration and said coupling is hollow and has a first and second end, said housing further including:
   a flange extending radially from said first end of said coupling;
   an annular wall portion secured to the peripheral edge of said flange;
   a plurality of elongated extensions, each of said extensions extending radially from said wall portion and being spaced circumferentially around said wall portion, each of said extensions defining one of said bores; and
   a cover plate removably secured to said wall portion and to said second end of said coupling such that said end plate, said coupling, said flange and said wall portion cooperate to define an annular cavity, said springs being located between the cover plate and said flange of the coupling.

3. Apparatus as set forth in claim 1 wherein,
   each of said axle sections further includes a cylindrical portion rotatably extending through one of said bores, said cylindrical portion having a first and second end, a head portion removably secured to said first end of said cylindrical portion, said head portion inhibiting radial movement of said axle away from said rotational axis of said housing;

a mounting cup removably secured to said second end of said cylindrical portion, and an outwardly-extending flange portion extending from each of said mounting cups for coupling of a blade thereto with said mounting cup disposed within a respective fan blade.

4. Apparatus as set forth in claim 2 wherein, said hub means provides a central opening for the slidable reception therethrough of said coupling;

said hub means being disposed for movement from a location adjacent said flange when said hub means is disposed in a first position thereof to a location proximal to said cover plate when said hub means is disposed in a second position thereof.

5. Apparatus as set forth in claim 1 including:

a plurality of cantilever mounted straps, each of said straps extending radially from one end of said hub member, each of said straps being disposed between adjacent ends of said axle sections, the distal end of each of said straps defining a guide portion, a plurality of guide posts, each guide post being rigidly secured to a segment of said housing and extending between said segment and said guide portion such that the distal end of said guide post slidably extends through a respective guide portion when said hub means moves one position thereof to the opposite position of the same;

said springs being compression springs and located such that a respective guide post is coaxial with and extends through a corresponding spring.

6. Apparatus as set forth in claim 2 including pressure differential means with said housing and cooperable with said hub means for selectively moving said hub means longitudinally relative to the axis of rotation of said housing against the force of said springs.

7. Apparatus as set forth in claim 6 wherein, said pressure differential means includes a flexible diaphragm, the periphery of said diaphragm being anchored between said wall portion and said cover plate, the central portion of said diaphragm being sealingly connected to one end of said hub member, and conduit means communicating with said housing on the side of the diaphragm opposed to the force of said springs against said hub member for supplying pressurized fluid to said diaphragm such that said hub member is caused to slide longitudinally along said coupling.

8. Apparatus as set forth in claim 7 wherein, said pressure differential means includes a swivel coupling for providing fluid communication between said housing and a source of pressurized fluid when said housing rotates relative to the source of pressurized fluid.

9. Apparatus as set forth in claim 1 wherein is provided, means for limiting the extent of shifting of the hub member in said housing, said limiting means being adjustable for preloading of said springs.

10. Apparatus as set forth in claim 9 wherein, said adjustable limiting means includes devices spaced 180° apart around the perimeter of the housing, operably associated with respective axle sections and engageable with fixed stops therefor on the housing.

11. Apparatus as set forth in claim 1, wherein said housing is provided with a cavity therein for reception of said power driven shaft, said cavity being located in and coaxial with the hub means to minimize the overall profile of said apparatus.

12. Apparatus as set forth in claim 2; including a plurality of mounting cups each disposed over one of said extensions, a portion of said fan blade being hollow for reception of one of said mounting cups such that the aerodynamic profile of said housing is minimized.

13. Apparatus as set forth in claim 12, wherein each of said mounting cups includes an outwardly extending flange portion for releasably securing said blade in position over said extension.

* * * * *